United States Patent
Göttling et al.

[11] Patent Number: 5,240,289
[45] Date of Patent: Aug. 31, 1993

[54] PLUG-TYPE CONNECTION FOR A TUBULAR BODY

[75] Inventors: Helmut Göttling, Isernhagen; Peter Müller, Hannover; Rudolf Möller; Gerhard Scharnowski, both of Gehrden, all of Fed. Rep. of Germany

[73] Assignee: Mannesmann Aktiengesellschaft, Dusseldorf, Fed. Rep. of Germany

[21] Appl. No.: 880,425

[22] Filed: May 8, 1992

[30] Foreign Application Priority Data

May 10, 1991 [DE] Fed. Rep. of Germany ....... 4115791

[51] Int. Cl.⁵ .................... F16L 35/00; F16L 21/06
[52] U.S. Cl. ..................... 285/24; 285/322; 285/328; 285/330; 285/331; 285/177
[58] Field of Search .......... 288/322, 323, 330, 331, 288/328, 24, 177

[56] References Cited

U.S. PATENT DOCUMENTS

| | | | |
|---|---|---|---|
| 2,935,338 | 5/1960 | Mills, Jr. | 285/328 X |
| 3,198,555 | 8/1965 | Johnson et al. | 285/330 X |
| 3,259,248 | 7/1966 | Wiegand | 285/330 X |
| 3,365,220 | 1/1968 | Rusche | 285/330 X |
| 4,026,581 | 5/1977 | Pasbrig | 285/331 X |
| 4,293,149 | 10/1981 | Bonel | 285/331 X |
| 4,508,374 | 4/1985 | Kantor | 285/331 X |
| 4,538,836 | 9/1985 | Krütten | 285/24 |
| 4,903,942 | 2/1990 | Licciardello et al. | 285/331 X |
| 5,042,844 | 8/1991 | Iida et al. | 285/903 X |

Primary Examiner—Dave W. Arola
Assistant Examiner—Heather Chun
Attorney, Agent, or Firm—Cohen, Pontani, Lieberman & Pavane

[57] ABSTRACT

A plug-type connection for a tubular body comprising a tubular holding element (1) slit in crown-like manner to form tongues (2) to receive the tubular body (30), and an annular collet (20) to be inserted onto the holding element (1) to clamp the end region of the tubular body (30) to the holding element (1). The collet (20) is a single piece and U-shaped in longitudinal section and has an inner arm (21) which is slit in crown-like manner and an outer arm (22). A circumferential shoulder (8) is formed on the holding element (1) outside the central bore (3). A pin (26) on the end of the outer arm (22) of the collet (20) fits into a depression (9) in the shoulder (8) of the holding element (1). A spherically shaped projection (27) fits into spherically shaped recess (10) in the shoulder (8) of the holding element (1). The recess (10) is staggered by an angle of rotation with respect to the depression (9). The spherically shaped projection (27) is located on the end of the pin (26).

8 Claims, 3 Drawing Sheets

PLUG-TYPE CONNECTION FOR A TUBULAR BODY

FIELD OF THE INVENTION

The present invention relates to a plug-type connection for a tubular body.

BACKGROUND OF THE INVENTION

A plug-type connection of this type is disclosed in German Patent Document No. OS 29 39 081 in which the actual plug-type connection consists essentially of two elements, namely the holding element and the annular collet acting thereon. The collet is U-shaped in longitudinal section so that there is an inner arm and an outer arm. The holding element is traversed in axial direction by a bore so that upon placing the collet on the holding element, the inner arm engages with the bore, and the outer arm surrounds the holding element on the outside. The inner arm and the end region of the holding element are slit in a crown-like manner which facilitates the mounting of the collet onto the holding element. This flexibility is the result of the crown-like slots which result in tongues that are resilient. Depending on the shape and position of the slots, and thereby the shape and position of the tongues, the plug connection can be loosened by rotation of the collet so that, for example, the tongues of the collet fit into the interstices between the tongues of the holding element. Since the slits between the tongues are made correspondingly large to obtain high flexibility of the interengaging regions of holding element and collet, the above-described malfunction correspondingly results.

Another plug-type connection is disclosed in European Patent Document No. EP 0 379 655 in which the plug connection has a holding element shaped like a connecting socket having a connection opening for detachably receiving the end region of a tubular body, for example a hose or tube. A collet is present which is provided with resilient clamping elements which clamp the tubular body against the inner wall of the bore in the holding element. The collet and the end region of the tubular body are held and fixed in position, and the collet is introduced into and clamped in the holding element together with an additional annular profiled ring. This additional clamping ring is required for fixing the collet on the end region of the tubular body. This plug however is expensive to fabricate and, additionally, the collet is too unstable and cannot also guide the end region of the tubular body into the correct position.

SUMMARY OF THE INVENTION

The object of the present invention is therefore to create a plug connection of the type described above which consists of only a few parts and also assures a dependable fixing and guidance of tubular bodies.

The plug-type connection of the present invention has in particular, the advantage that, by a few, functionally developed elements, quick fastening of the end of a tubular body in a holding element is obtained, and, in addition, the end of the tubular body is guided into its proper position. The design of the collet and the holding element of the present invention allows for rapid assembly which is effected simply by placing the collet on the holding element and subsequently introducing the end of the tubular body through the collet into the holding element. The holding element consists of one piece and is slit in crown-like fashion adjacent to the collet. The zones which thus result are thickened near the inner edge so that an undercut results into which engages a correspondingly complementary contour of the inner arm of the collet. As a result, the end of the tubular body can be fixed in position in a rather simple and self-stabilizing manner. This has the further advantage that the complementary contour of the inner arm of the collet which engages into the undercut is obtained by a correspondingly shaped thickening of the inner arm. It is also advantageous that the inner arm of the collet is provided, on the side resting against the tubular body, with an elevated toothing which extends toward the tubular body. This toothing engages with the wall of the tubular body and fixes the tubular body in position. The toothing must, however, be made so flat that it cannot damage the wall of the tubular body. Thus, the wall of the tubular body presses the collet in its thickened region against the undercut in the end region of the holding element and, in addition, also provides guidance of the end of the tubular body into the connector. In the fixed condition, the outer arm of the collet grips around the holding element near the tongues from the outside and thus holds the tongues of the holding element together. As a result, in addition to fixing the tubular body in position, the end of the tubular body is guided. By providing the inner arm of the collet with slits, the collet can very easily be pushed onto the holding element.

A shoulder is formed in the holding element below the depth of the slits between the tongues to provide a stop so that the collet can be inserted onto the holding element to a predetermined position. It is also advantageous to provide, on the end of the collet, at least one pin which can be inserted into a correspondingly positioned recess in the shoulder of the holding element. Thus, a predetermined desired position of the collet on the holding element is established for the assembly step in which the tubular body is then inserted into the holding element. The additional provision of a spherically shaped protrusion on the end of the pin and of a spherically shaped recess staggered by a corresponding angle of rotation in the shoulder of the holding element results in a second lockable desired position of the collet on the holding element. This second desired position is used when the tubular body has already been inserted into the holding element through the collet and the entire plug connection is to be locked. This combination in particular results in a very quick connect/disconnect plug connection while at the same time assuring a very dependable and secure holding of the tube in its locked, completely assembled, final position.

The arrangement within the collet of a projection which then engages with one of the slits between the tongues of the holding element results in a very simple manner in an additional assurance against the turning of the collet on the holding element. This projection must, however, be shaped and positioned so that it permits a turning of the collet between the two possible positions: the first position being the engagement of the pin-shaped development into the corresponding recess, and the second position being the engagement of the spherically shaped projection into the spherically shaped recess. As a whole, such a plug connection is particularly suitable for use for connecting of pneumatic components.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENT

Figure 1:
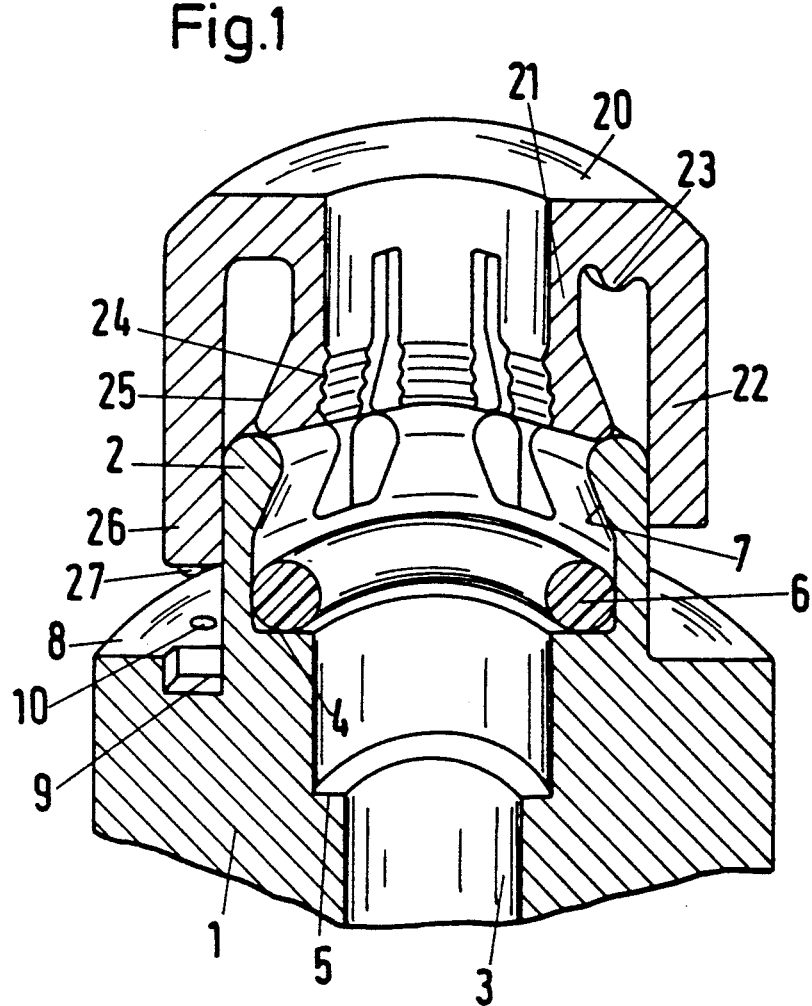
FIGS. 1 to 3 are longitudinal sections of the plug type connection for a tubular body of the present invention through a holding element with collet, the sequence of FIGS. 1 to 3 showing the establishing of a clamping connection between the holding element and a tubular body.

FIG. 1 is a partial, longitudinal section through holding element 1 and collet 20 in the first assembly step. The tube which is to be inserted into bore 3 of holding element 1, for example the end of a hose or tube, is not shown in FIG. 1 since, prior to the insertion of the end of the tube, collet 20 must first be brought against holding element 1 as shown in the figure. Tubular holding element 1 has a shoulder 8 on its outer circumference which acts as a stop for the longitudinal movement of outer arm 22 of collet 20. In the receiving region where collet 20 engages with holding element 1, crown-like slits are cut into holding element 1 to form tongues 2. This receiving region of holding element 1 acts as connection socket. In longitudinal section, tongues 2 have, on their outer circumference, a linear contour and, towards the inside of central bore 3, a thickening with a bevelling which results in undercut 7. Packing ring 6 rests against first shoulder 4 of bore 3 of holding element 1. Second shoulder 5 acts as a stop for the tube end when introduced. Near outer arm 22, collet 20 is linear in shape on the inside and near inner arm 21 it is provided with a complementary thickening 25 which engages with undercut 7 of holding element 1. This contour can also be achieved by a slightly S-shaped development of inner arm 21 of collet 20. The integral nature of collet 20 in this embodiment is nevertheless maintained, as is the stability which results from outer arms 22 of collet 20, which can be pushed very far on tongues 2 of holding element 1. Inner arm 21 of collet 20 is also slit in the same way as the crown-like slit end region of holding element 1. Outer arm 22 of collet 20, on the other hand, is not slit. The slitting of both holding element 1 near its connection socket and the inner arm 21 of collet 20 permits collet 20 to slide down upon the undercut 7 of holding element 1. Furthermore, the slitting of both collet 20 and holding element 1 allows the undercut contour to be obtained without the insertion of an additional correspondingly shaped ring. In this way, it is then possible for the plug connection to consist substantially of only two parts, namely collet 20 and holding element 1.

Additionally, collet 20 is provided with at least one projection 23 which engages with a crown-like slit between tongues 2. Projection 23 acts as an anti-twisting mechanism.

Figure 2:
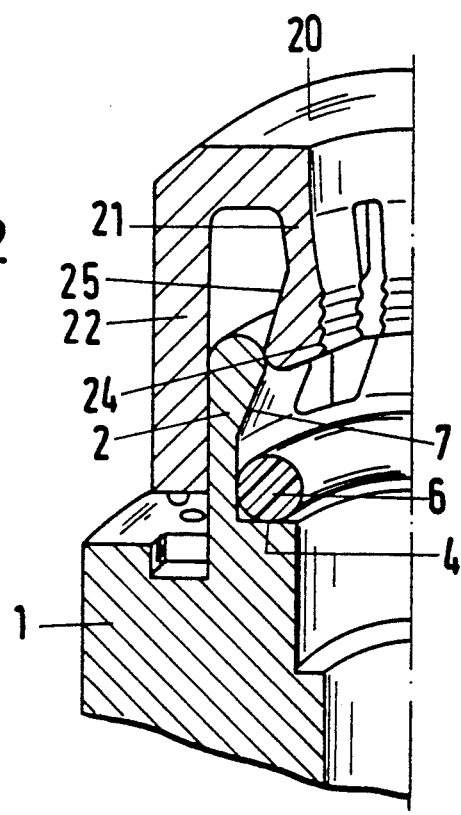

FIG. 2 shows the next step in assembly in which collet 20 has already been pushed partially onto holding element 1. In this step of assembly, inner arm 21 of collet 20 moves radially inward in response to an external pushing force applied by tongues 2. To achieve this movement of inner arm 21 by merely pushing collet 20 onto holding element 1, the interacting edge regions of inner arm 21 of collet 20 and of tongues 2 of holding element 1 are suitably rounded. Collet 20 is then pushed onto holding element 1 down into its locked position without the tubular body having been inserted previously through collet 20 into bore 3 of holding element 1. Collet 20 must be pushed so far down onto holding element 1 that the bevel of complementary thickening 25 of inner arm 21 of collet 20 engages with undercut 7 of holding element 1 and is thus seated firmly. With respect to its rotational symmetry, collet 20 must be pushed down onto holding element 1 in such a rotated position that at least one pin 26 formed on the end of outer arm 22 is within at least one depression 9 in shoulder 8 of holding element 1. In the next step, the tubular body 30 is then pushed through collet 20 into central bore 3 of holding element 1 until the end 31 of tubular body 30 rests against second shoulder 5 of central bore 3. Upon insertion of tubular body 30, collet 20 is displaced by a small distance in an axial direction towards holding element 1. Outer arm 22 of collet 20, shoulder 8 of holding element 1, and pin 26 are so dimensioned that this displacement is possible. In this case, complementary thickening 25 of inner arm 21 of collet 20 moves down on the bevel of undercut 7 of holding element 1 so that the slit inner arm 21 of collet 20 yields resiliently and thus facilitates the entry of tubular body 30 into holding element 1. Once tubular body 30 has been inserted up to second shoulder 5 in central bore 3 of holding element 1 and packing ring 6 sealingly engages with the outer wall of tubular body 30 collet 20 is slightly pulled back so that complementary thickening 25 moves upward on the bevel of undercut 7, and toothing 24 thus acts strongly upon the outer wall of tubular body 30. Collet 20 is turned by an angle until spherically shaped projection 27 on pin 26 on the end of outer arm 22 fits into spherically shaped recess 10 positioned at the corresponding place on shoulder 8. In this way, undesired detachment of the tubular body is prevented by undesired pressing of collet 20 from the outside in the direction towards holding element 1. Detachment of tubular body 30 is effected only when collet 20 is again turned back a given angle until pin 26 can enter into depression 9 in shoulder 8 of holding element 1 so that collet 20 can again be moved a corresponding distance towards holding element 1. At the same time, complementary thickening 25 moves on the bevel of undercut 7 so that the slit inner arm 21 of collet 20 loosens toothing 24 from the wall of tubular body 30 and thus permits tubular body 30 to be pulled out.

Figure 3:
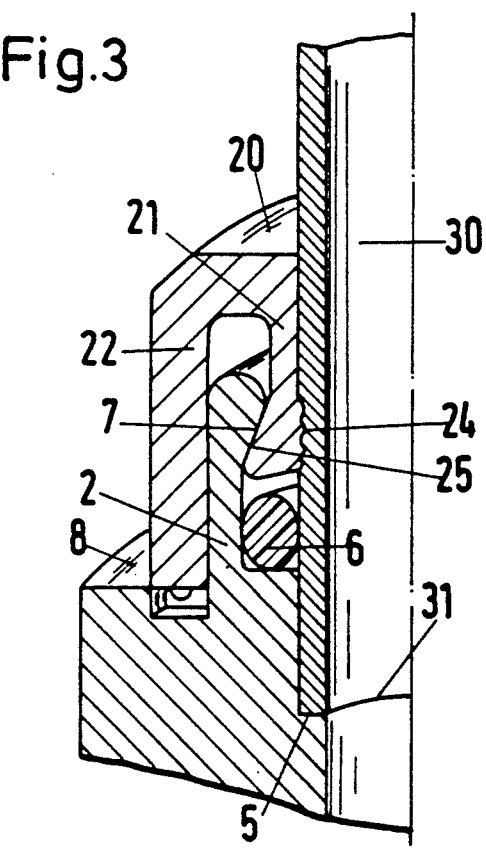

FIG. 3 shows the state of completed assembly in which end 31 of tube 30 is fixed in position in central bore 3 of holding element 1 by collet 20 and is sealed by packing ring 6. In this connection of assembly, outer arm 22 of collet 20 firmly grips around tongues 2 or their outer circumference so that they are held fast in this position. Toothing 24 of inner arm 21 of collet 20 engages with tube 30 so that end 31 of tube 30 is prevented from being pulled out of collet 20. The complementary contours of the inner arm 21 of collet 20 and the inner contours of tongues 2 of holding element 1 interlock with one another so that, as a whole, tube 30, together with collet 20, are prevented from being pulled out. In assembled condition, packing ring 6 is compressed between the wall of bore 3 and the wall of tube 30. Packing ring 6 is comprised of elastic material. Between outer arm 22 of collet 20 and shoulder 8 of holding element 1, there is, however, still enough free space so that collet 20 can be pushed from the outside by pushing in an axial direction towards holding element 1, over a certain though small distance towards holding element 1. This is possible when collet 20 is turned out of the locked position in which spherically shaped projection 27 is engaged with spherically shaped recess 10 as described above with reference to FIG. 2, and pin 26 can enter into depression 9. The complementary contours of tongues 2 of holding element 1 and of collet 20 release toothing 24 upon further insertion and thus permit end 31 of tube 30 to be pulled out.

There are several points over the length of tube 30 where tube 30 is fastened in place into the plug connection. The first point is provided by toothing 24 of inner arm 21 of collet 20; another point is provided by packing ring 6 mounted on first shoulder 4 of bore 3; and the third point is provided by second shoulder 5. Since outer arm 22 of collet 20 rigidly surrounds the receiving region of holding element 1, a secured and stationary fastening area of tube 30 is thereby also established so that tube 30 is securely held in each fastening region along the entire length which is to be introduced into the plug connection. As a result, tube 30 is not only prevented from being pulled out, but is also guided over the length of its plug connection. This design, furthermore, has the result that upon the application of a buckling load on tube 30, collet 20 is prevented from lifting off, thereby a disconnection of the plug is avoided.

In the event that the plug connection of the present invention is to be used in pneumatics or hydraulics, an additional securing function results. If the pressure fluid acting in bore 3 below packing ring 6 moves packing ring 6 upward towards collet 20, then packing ring 6 is pressed against the end surface of inner arm 21 of collet 20. Collet 20 is thereby also lifted a small distance. As a result, however, thickening 25 of inner arm 21 travels upward on the bevel of undercut 7 and presses toothing 24 of inner arm 21 of collet 20 with increased pressure into the outer wall of end 31 of tube 30 and then holds it fast with increased force. Thus, an unintended springing off of the tubular body upon its use in pneumatic or hydraulic conduit systems is prevented in a particularly advantageous and functionally simple manner.

Figure 4:
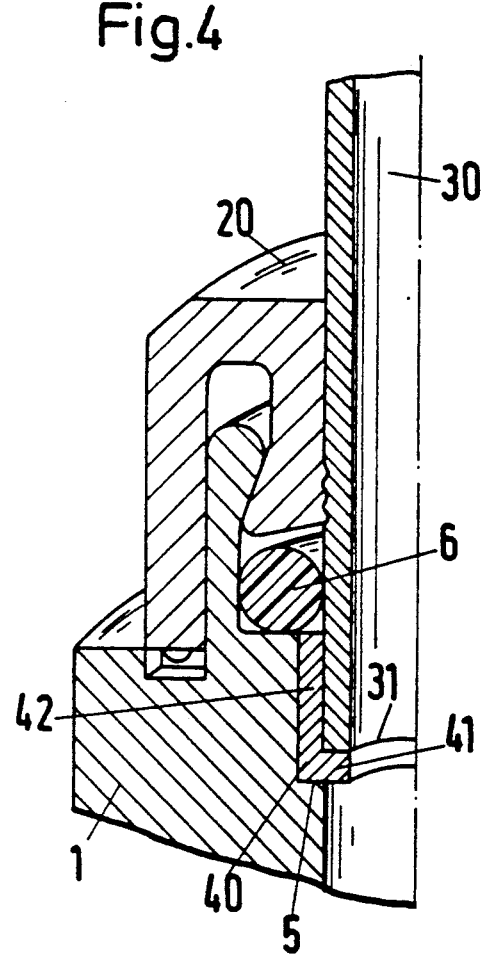
FIG. 4 shows another embodiment of the present invention in which the holding element is provided with a reducer ring to mount tubes with smaller diameters.

FIG. 4 shows the plug connection upon the use of a tubular body or of a tube of a smaller diameter than that provided by bore 3 of the holding element 1. In this case, reducer ring 40 is used which has an L-shaped profile in longitudinal section. Reducer ring 40 rests on second shoulder 5 of central bore 3 of holding element 1 in such a manner that, on the one hand, end 31 of the tubular body or tube 30 is guided by long arm 42 of reducer ring 40 in axial direction and rests with its end against short arm 41. The length of short arm 41 of reducer ring 40 is so selected that it does not obstruct the inner bore of tube 30 and yet supports the end 31 of tube 30 within bore 3. However, when using a tube of smaller diameter, a different collet 20 and packing ring 6, adapted to this smaller diameter, is also used.

As a result, tubular bodies of different diameters can be inserted on the same holding element. Depending on the diameter of the tubular body or tube, a corresponding size for the collet, packing ring and reducer ring must be used. Reducer ring 40, however, merely supplies a better hold and contributes nothing to the function of the plug connection which consists basically only of a single-piece holding element and a single-piece collet.

The plug connection of the present invention can be comprised of plastic, in which case the resilient elastic properties are particularly advantageous. The single-piece collet can also be comprised of a metal/plastic-composite in which inner arm 21 of collet 20 is made of plastic, so that it is highly elastic and collet 20 can be pushed down onto holding element 1. Outer arm 22 can be comprised of metal so that they rigidly surround tongues 2 of holding element 1. The single-piece design of the collet and of all functional elements of the plug connection is present also in this case. It would, however, also be possible to make the collet entirely of metal, in which case the contour of the inner arm which engages into the undercut can be achieved by a corresponding S-shaped bend in the slit end region. The outer arm of the collet is preferably very stiff so that, after snapping the collet onto the circumferential tongues of the holding element, a secure hold is provided as described above. The wide overlap of the outer arm of the collet over the tongues of the holding element not only fixes the tube in position, but also guides the tube end reliably in the plug region. In this way, a high stiffness and a high resistance to buckling results near the holding element where the tube end has been introduced. By the mutually adapted structural features of the plug connection, the danger that a buckling load will unexpectedly detach the collet thereby disconnecting the entire plug is also avoided.

Thus, while there have been shown and described and pointed out fundamental novel features of the invention as applied to a preferred embodiment thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto.

What is claimed is:

1. A plug type connection for a tubular body, comprising:
   a tubular single-piece holding element (1) having an upper end a central bore (3) extending longitudinally through said holding element (1), the central bore (3) having a diameter sufficient to receive the tubular body and having a plurality of stepped shoulders therein, said holding element (1) comprising:
   a plurality of tongues (2) formed by a plurality of crown-like slits that extend down from said upper end of said holding element (1) a predetermined depth, the tongues (2) having an inner surface and an outer surface, and an undercut (7) in the inner surface of the tongues (2) forming a bevelled surface causing the diameter of said central bore to decrease in the direction of said upper end; and
   a shoulder (8) about an outer circumference of the holding element (1) outside of said central bore (3) and positioned a distance from the upper end of said holding element (1), the distance being greater than the predetermined depth of the slits forming the tongues (2), the shoulder (8) having a depression (9) and a spherically shaped recess (10) therein, the spherically shaped recess (10)

being staggered by an angle of rotation with respect to the depression (9); and a single-piece annular collect (20) having a U-shape in longitudinal section and capable of being mounted onto said holding element (1) to clamp an end region of the tubular body to said holding element (1), said collect (20) comprising:

an outer arm (22) shaped so as to be capable of surrounding the tongues (2) of said holding element (1) on the outer surface of the tongues (2) when said holding element (1) and said collect (20) are in an assembled condition, the outer arm (22) having a pin (26) positioned so as to fit into the depression in the shoulder (8) of said holding element (1), the pin (26) having a spherically shaped projection (27) extending therefrom and shaped so as to fit into the spherically shaped recess (10) in the shoulder (8) of said holding element (1); and an inner arm (21) shaped so as to be capable of extending into the central bore (3) of said holding element (1) when said holding element (1) and said collect (20) are in an assembled condition, the inner arm (21) having a plurality of crown-like slits that form a plurality of tongues in the inner arm (21) and that are provided with a complementary contour (25) which engages into the undercut (7) of the tongues (2) of said holding element (1), the inner arm (21) having an inner surface that contacts the tubular body when the tubular body is inserted into said plug-type connection and said arms are moved toward said upper end so that said complementary contours on said tongues engage said bevelled surface.

2. The plug-type connection of claim 1, wherein the complementary contour (25) of the inner arm (21) of said collect (20) is S-shaped.

3. The plug-type connection of claim 1, wherein the inner surface of the inner arm (21) of the collect (20) has raised teeth (24) extending perpendicular to the inner surface of the inner arm (21).

4. The plug-type connection of claim 1, wherein one of the plurality of shoulders within the central bore (3) of said holding element (1) is a packing ring shoulder (4), and further comprising an annular packing ring (6) mounted within the central bore (3) of said holding element (1) and on the packing ring shoulder (4), said packing ring (6) being of a size sufficient to provide a seal between said holding element (1) and the tubular body.

5. The plug-type connection of claim 1, wherein said collet (20) has a projection (23) extending downward and positioned between the outer arm (22) and the inner arm (21) of said collet (20) and being shaped so as to be insertable between two adjacent tongues (2) of said holding element (1).

6. The plug-type connection of claim 1, wherein one of the plurality of shoulders within the central bore (3) of said holding element (1) is a reducer ring shoulder (5), and further comprising a reducer ring (40) mounted within the central bore (3) of said holding element (1) and on the reducer ring shoulder (5), said reducer ring (40) having an L-shape in longitudinal section and being of a size sufficient to reduce the diameter of the central bore (3).

7. The plug-type connection of claim 1, wherein said collet (20) is comprised of metallic material.

8. The plug-type connection of claim 1, wherein the inner arm (21) of said collet (20) is comprised of an elastic and wherein the outer arm (22) of said collet (20) is comprised of a metal.

* * * * *